United States Patent
Kameda et al.

(10) Patent No.: US 11,400,954 B2
(45) Date of Patent: Aug. 2, 2022

(54) VEHICLE CONTROL SYSTEM, VEHICLE CONTROL METHOD, AND PROGRAM RECORDING MEDIUM

(71) Applicant: NEC Corporation, Tokyo (JP)

(72) Inventors: Yoshio Kameda, Tokyo (JP); Riki Eto, Tokyo (JP); Wemer Wee, Tokyo (JP); Yusuke Kikuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 447 days.

(21) Appl. No.: 16/305,441

(22) PCT Filed: Jun. 5, 2017

(86) PCT No.: PCT/JP2017/020750
§ 371 (c)(1),
(2) Date: Nov. 29, 2018

(87) PCT Pub. No.: WO2017/213064
PCT Pub. Date: Dec. 14, 2017

(65) Prior Publication Data
US 2020/0317220 A1 Oct. 8, 2020

(30) Foreign Application Priority Data
Jun. 9, 2016 (JP) .............................. JP2016-114997

(51) Int. Cl.
*B60W 60/00* (2020.01)
*B60W 40/105* (2012.01)
(Continued)

(52) U.S. Cl.
CPC ........ *B60W 60/001* (2020.02); *B60W 40/105* (2013.01); *B60W 40/107* (2013.01);
(Continued)

(58) Field of Classification Search
CPC ....... B60W 60/001; B60W 2554/4041; B60W 40/105; B60W 40/107; G06K 9/6256; G06K 9/6267
(Continued)

(56) References Cited

U.S. PATENT DOCUMENTS

2003/0050742 A1  3/2003  Sakamoto et al.
2005/0090963 A1  4/2005  Kuhn et al.
(Continued)

FOREIGN PATENT DOCUMENTS

JP   2002-181179 A   6/2002
JP   2003-50605 A    2/2003
(Continued)

OTHER PUBLICATIONS

James Max Kanter et al., "Deep Feature Synthesis: Towards Automating Data Science Endeavors", 2015 IEEE International Conference on Data Science and Advanced Analytics (DSAA), 2015, pp. 1-10, 10 pages.
(Continued)

*Primary Examiner* — Krishnan Ramesh
(74) *Attorney, Agent, or Firm* — Sughrue Mion, PLLC

(57) ABSTRACT

A vehicle control system for controlling driving of a vehicle reflecting an environment and a characteristic of a user, while suppressing increase in learning time, is provided. The vehicle control system includes classification means for classifying, by using one or more attributes selected from accumulation means for accumulating data including attributes relating to driving of a vehicle, driving properties included in the data, learning means for learning a model representing the driving property, for each of types that are a result of classification by the classification means, and control information determination means for determining, by using the model learned for the type associated with a
(Continued)

| TYPE | CONDITION | MODEL |
|---|---|---|
| B1 | DRIVER ID = 0 OR 1 AND WEATHER = CLEAR OR FAIR OR CLOUDY | ACCELERATION PATTERN B1 |
| B2 | DRIVER ID = 2 AND WEATHER = CLEAR OR FAIR OR CLOUDY | ACCELERATION PATTERN B2 |
| B3 | DRIVER ID = 3 AND WEATHER = CLEAR OR FAIR OR CLOUDY | ACCELERATION PATTERN B3 |
| B4 | DRIVER ID = 0 OR 1 AND WEATHER = RAIN | ACCELERATION PATTERN B4 |
| B5 | DRIVER ID = 2 OR 3 AND WEATHER = RAIN | ACCELERATION PATTERN B5 |
| B6 | WEATHER = SNOW | ACCELERATION PATTERN B6 | value of the attribute at time of driving of a control target vehicle, control information for the driving.

7 Claims, 16 Drawing Sheets

(51) Int. Cl.
*B60W 40/107* (2012.01)
*G06K 9/62* (2022.01)

(52) U.S. Cl.
CPC ......... *G06K 9/6256* (2013.01); *G06K 9/6267* (2013.01); *B60W 2554/4041* (2020.02)

(58) Field of Classification Search
USPC .......................................................... 701/23
See application file for complete search history.

(56) References Cited

U.S. PATENT DOCUMENTS

| | | |
|---|---|---|
| 2008/0167820 A1 | 7/2008 | Oguchi et al. |
| 2009/0299496 A1* | 12/2009 | Cade ...................... G05B 17/02 700/29 |
| 2011/0179370 A1* | 7/2011 | Cardno ................. G06F 16/904 715/771 |
| 2014/0039834 A1 | 2/2014 | Shibuya et al. |
| 2016/0042650 A1* | 2/2016 | Stenneth .................. G09B 5/00 701/23 |
| 2018/0052458 A1* | 2/2018 | Tsuji .................... B60W 30/143 |

FOREIGN PATENT DOCUMENTS

| | | |
|---|---|---|
| JP | 2005-511392 A | 4/2005 |
| JP | 2006-327545 A | 12/2006 |
| JP | 2011-85431 A | 4/2011 |
| JP | 2011-227833 A | 11/2011 |
| JP | 2014-32455 A | 2/2014 |
| JP | 2015-89801 A | 5/2015 |
| JP | 2015-225384 A | 12/2015 |
| WO | 2015/037165 A1 | 3/2015 |

OTHER PUBLICATIONS

Ryouhei Fujimaki et al., "Research and Development of Heterogeneous Mixture Learning Technique and Big Data Analysis Solution", [online], [retrieved on Apr. 27, 2017], the Internet <http://www.fbi-award.jp/sentan/jusyou/2015/7.pdf>, 14 pages.

International Search Report dated Jul. 18, 2017 issued by the International Searching Authority in PCT/JP2017/020750.

Written Opinion dated Jul. 18, 2017 issued by the International Searching Authority in PCT/JP2017/020750.

* cited by examiner

Fig. 7

| DRIVER ID | SPEED IN ACCELERATION [km/h] | SPEED IN DECELERATION [km/h] | BRAKING DISTANCE [m] | WEATHER |
|---|---|---|---|---|
| 0 | {0, 7, 15, ⋯} | - | - | CLEAR |
| 0 | {0, 7.3, 16, ⋯} | - | - | FAIR |
| 0 | {0, 3.2, 6.8, ⋯} | - | - | RAIN |
| 0 | - | {50, 42, 36, ⋯} | 60 | CLOUDY |
| 0 | - | {30, 22, 14, ⋯} | 35 | FAIR |
| 1 | {0, 8, 20, ⋯} | - | - | FAIR |

CLEAR, FAIR, CLOUDY

Fig. 11

| TYPE | CONDITION | MODEL |
|---|---|---|
| A1 | DRIVER ID=0 OR 1 | ACCELERATION PATTERN A1 |
| A2 | DRIVER ID=2 | ACCELERATION PATTERN A2 |
| A3 | DRIVER ID=3 | ACCELERATION PATTERN A3 |

Fig. 12

| TYPE | CONDITION | MODEL |
|---|---|---|
| B1 | DRIVER ID = 0 OR 1 AND WEATHER = CLEAR OR FAIR OR CLOUDY | ACCELERATION PATTERN B1 |
| B2 | DRIVER ID = 2 AND WEATHER = CLEAR OR FAIR OR CLOUDY | ACCELERATION PATTERN B2 |
| B3 | DRIVER ID = 3 AND WEATHER = CLEAR OR FAIR OR CLOUDY | ACCELERATION PATTERN B3 |
| B4 | DRIVER ID = 0 OR 1 AND WEATHER = RAIN | ACCELERATION PATTERN B4 |
| B5 | DRIVER ID = 2 OR 3 AND WEATHER = RAIN | ACCELERATION PATTERN B5 |
| B6 | WEATHER = SNOW | ACCELERATION PATTERN B6 |

Fig. 13

| TYPE | CONDITION | MODEL |
|---|---|---|
| C1 | WEATHER = CLEAR OR FAIR OR CLOUDY | BRAKING DISTANCE RATIO = 1 |
| C2 | DRIVER ID = 0 OR 1 AND WEATHER = RAIN | BRAKING DISTANCE RATIO = 1.2 |
| C3 | DRIVER ID = 2 OR 3 AND WEATHER = RAIN | BRAKING DISTANCE RATIO = 1.4 |
| C4 | WEATHER = SNOW | BRAKING DISTANCE RATIO = 1.8 |

Fig. 14

| ELAPSED TIME (s) | 0 | 1 | 2 | 3 | 4 | 5 |
|---|---|---|---|---|---|---|
| SPEED (km/h) | 0 | 7 | 15 | 30 | 55 | 60 |

VEHICLE CONTROL SYSTEM, VEHICLE CONTROL METHOD, AND PROGRAM RECORDING MEDIUM

This application is a National Stage Entry of PCT/JP2017/020750 filed on Jun. 5, 2017, which claims priority from Japanese Patent Application 2016-114997 filed on Jun. 9, 2016, the contents of all of which are incorporated herein by reference, in their entirety.

TECHNICAL FIELD

The present disclosure relates to a vehicle control system, a vehicle control method, and a program recording medium, and particularly relates to a vehicle control system, a vehicle control method, and a program recording medium that control a vehicle reflecting an environment and a characteristic of a user.

BACKGROUND ART

An automated driving technique for automatically driving a vehicle has been developed in order to reduce a driving burden or the like on a driver of a vehicle. Further, a technique that provides driving adapted to a preference and a driving style of a driver has been also proposed. Thereby, it is possible to assist driving adapted to a preference of a driver.

For example, PTL 1 discloses a control method for obtaining a driving property fitted for a preference and a driving style of a user. In this control method, learning data or driving data of a plurality of users are accumulated in a server for each user and shared, and control gain is changed in such a way as to be adapted to the user. As a result, safe and comfortable driving is realized.

Further, PTL 2 discloses a driving control device that enables automated driving in which uncomfortable feeling for a driver is suppressed. In this driving control device, at the time of manual driving control, driving operation of a driver is learned in association with a plurality of items that are preset and determines a driving environment of a vehicle, and at the time of automated driving control, the vehicle is controlled with reference to a learning result for the driving environment at the time point. As a result, uncomfortable feeling for the driver at the time of automated driving is suppressed.

PTL 3 discloses a predictive control method and the like for automatically constructing a predictive control model in such a way as to decrease a difference between the predictive control model and the real world.

PTL 4 discloses a driving assist system and the like capable of improving economy of the entirety including a preceding vehicle, an own vehicle, and a following vehicle.

PTL 5 discloses a control device and the like in which assistance to a driver is improved, with respect to an existing device in which an operation mode of a control and adjustment system is automatically adopted to a driving style of the driver, depending on a driving style value.

Furthermore, as a related technique, NPL 1 discloses a technique relating to an automatic-generation of a feature-quantity in machine learning. NPL 2 discloses a technique relating to heterogeneous mixture learning.

CITATION LIST

Patent Literature

[PTL 1] Japanese Patent Application Laid-Open Publication No. 2003-050605

[PTL 2] Japanese Patent Application Laid-Open Publication No. 2015-089801

[PTL 3] International Publication No. WO 2015/037165

[PTL 4] Japanese Patent Application Laid-Open Publication No. 2015-225384

[PTL 5] Japanese Translation of PCT International Application Publication Japanese Patent Application Laid-Open Publication (Translation of PCT Publication) No. 2005-511392

Non Patent Literature

[NPL 1] James Max Kanter, Kalyan Veeramachaneni, "Deep Feature Synthesis: Towards Automating Data Science Endeavors", 2015 IEEE International Conference on Data Science and Advanced Analytics (DSAA), 2015, pp. 1-10.

[NPL 2] Ryouhei Fujimaki, and four others, "Research and Development of Heterogeneous Mixture Learning Technique and Big Data Analysis Solution, [online], [retrieved on Apr. 27, 2017], the Internet <http://www.fbi-award.jp/sentan/jusyou/2015/7.pdf>

SUMMARY OF INVENTION

Technical Problem

In the techniques disclosed in PTLs 1 and 2 described above, information concerning driving of a vehicle is accumulated and learned for each user. As a result, there is a problem that learning time increases as an amount of the accumulated information increases.

PTLs 3 to 5 do not disclose a technique for suppressing increase in learning time in control concerning driving of a vehicle.

The present invention has been made in view of the above-described problem, and an example object thereof is to provide a vehicle control system and the like for controlling driving of a vehicle reflecting an environment and a characteristic of a user, while suppressing increase in learning time.

Solution to Problem

A vehicle control system according to an exemplary aspect of the present invention includes: classification means for classifying, by using one or more attributes selected from accumulation means for accumulating data including attributes relating to driving of a vehicle, driving properties included in the data; learning means for learning a model representing the driving property, for each of types that are a result of classification by the classification means; and control information determination means for determining, by using the model learned for the type associated with a value of the attribute at time of driving of a control target vehicle, control information for the driving.

A vehicle control method according to an exemplary aspect of the present invention includes: classifying, by using one or more attributes selected from accumulation means for accumulating data including attributes relating to driving of a vehicle, driving properties included in the data; learning a model representing the driving property, for each of types that are a result of classification; and determining, by using the model learned for the type associated with a value of the attribute at time of driving of a control target vehicle, control information for the driving.

A computer readable storage medium according to an exemplary aspect of the present invention records thereon a program causing a computer to perform processes including: classifying, by using one or more attributes selected from accumulation means for accumulating data including attributes relating to driving of a vehicle, driving properties included in the data; learning a model representing the driving property, for each of types that are a result of classification; and determining, by using the model learned for the type associated with a value of the attribute at time of driving of a control target vehicle, control information for the driving.

Advantageous Effects of Invention

According to the present invention, it is possible to achieve an advantageous effect to control driving of a vehicle reflecting an environment and a characteristic of a user, while suppressing increase in learning time, in a vehicle control system.

BRIEF DESCRIPTION OF DRAWINGS

FIG. 7 is a diagram illustrating an example of information (data) accumulated in an accumulation unit of the vehicle control system according to the fourth example embodiment of the present invention.

FIG. 11 is a diagram illustrating an example of type information.

FIG. 12 is a diagram illustrating an example of type information.

FIG. 13 is a diagram illustrating an example of type information.

FIG. 14 is a diagram illustrating an example of a model set in a control unit by a model setting unit.

EXAMPLE EMBODIMENT

Figure 1:
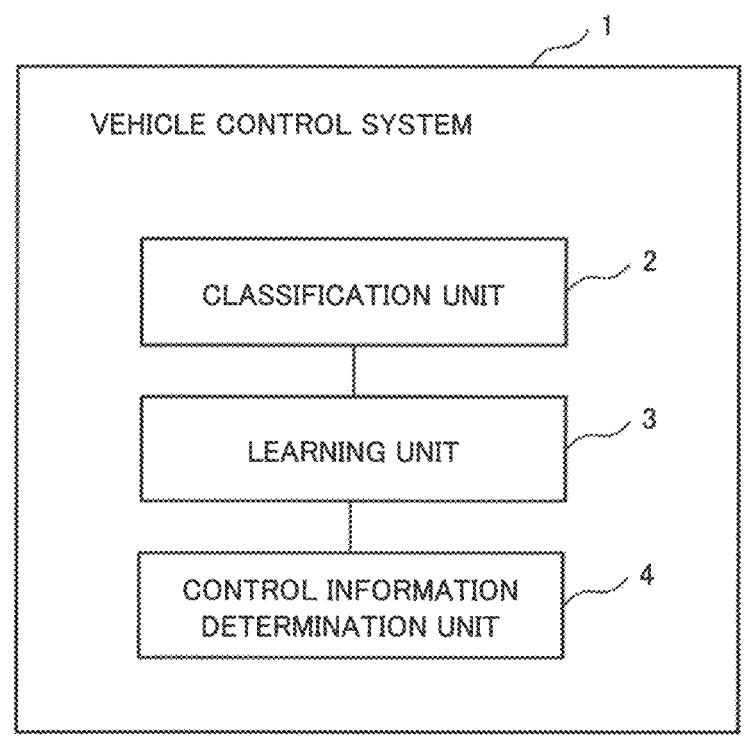
FIG. 1 is a block diagram illustrating a configuration of a vehicle control system according to a first example embodiment of the present invention.

Hereinafter, example embodiments of the present invention are described in detail with reference to the drawings. Note that a direction of arrow in the drawings represents an example, and does not limit a direction of a signal between blocks.

First Example Embodiment

FIG. 1 is a block diagram illustrating a configuration of a vehicle control system 1 according to a first example embodiment of the present invention. The vehicle control system 1 according to the first example embodiment includes a classification unit 2, a learning unit 3, and a control information determination unit 4.

The classification unit 2 classifies, by using one or more attributes selected from accumulation means that accumulates data including attributes relating to driving of a vehicle, driving properties included in the data. The learning unit 3 learns a model representing the driving property, for each of types that are a result of classification by the classification unit 2.

The control information determination unit 4 determines, by using a model learned for a type associated with a value of an attribute at a time of driving of a control target vehicle, control information for the driving.

By adopting the above-described configuration, according to the first example embodiment, a model representing a driving property is learned for each type, and thus, it is possible to achieve an advantageous effect to control driving of a vehicle reflecting an environment or a characteristic of a user, while suppressing increase in learning time.

Second Example Embodiment

Figure 2:
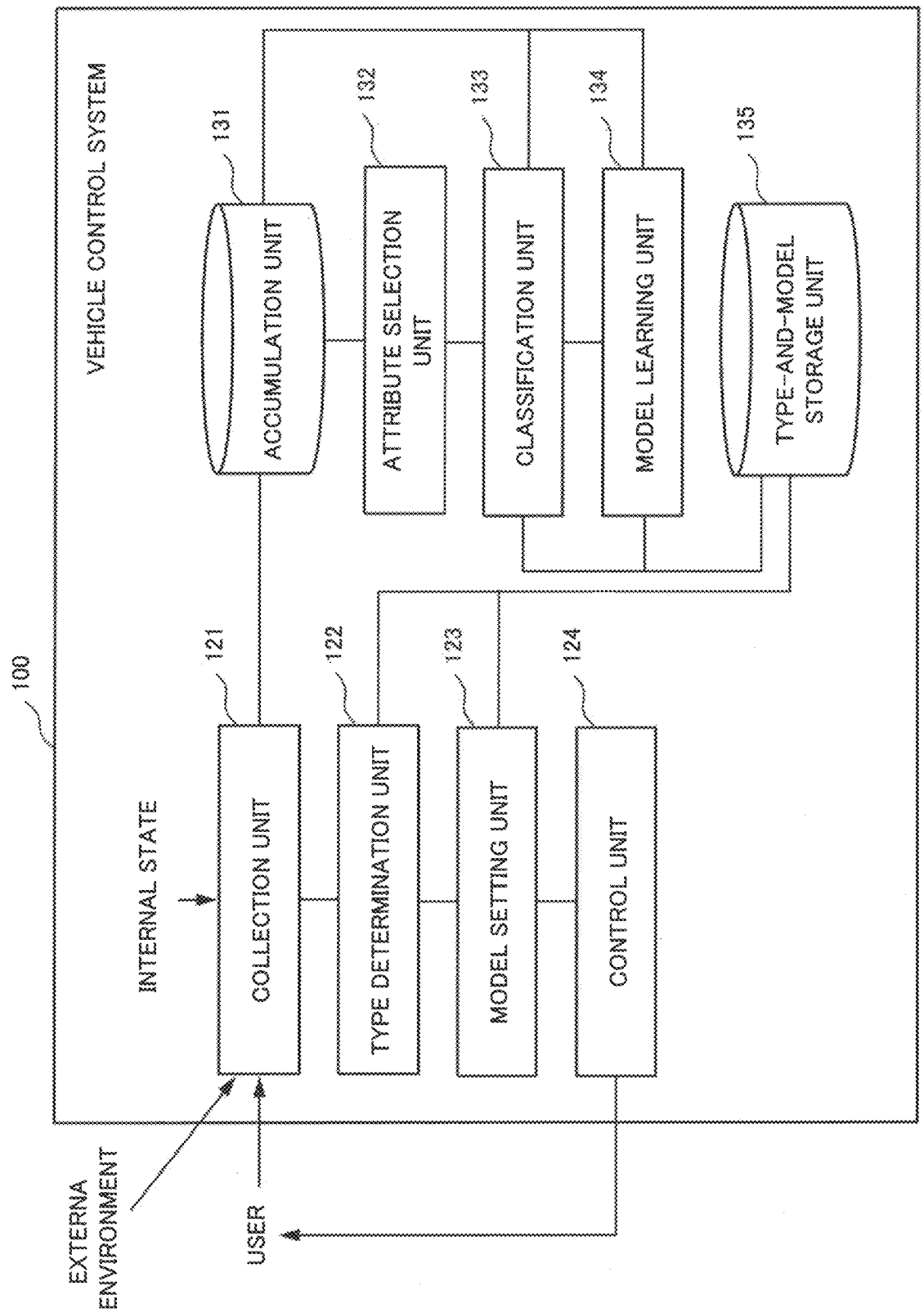
FIG. 2 is a diagram illustrating a configuration of a vehicle control system according to a second example embodiment of the present invention.

FIG. 2 is a diagram illustrating a configuration of a vehicle control system 100 according to a second example embodiment of the present invention. The vehicle control system 100 according to the second example embodiment includes a collection unit 121, a type determination unit 122, a model setting unit 123, a control unit 124, an accumulation unit 131, an attribute selection unit 132, a classification unit 133, a model learning unit 134, and a type-and-model storage unit 135.

An outline of each constituent element of the vehicle control system 100 is described.

The collection unit 121 collects information indicating a user, an external environment, an internal state, and the like of the vehicle control system 100. The collection unit 121 may include a sensor, a camera, an input means, and a reading device, for example.

The type determination unit 122 determines which type a use situation of the vehicle control system 100 belongs to, by using information stored in the type-and-model storage unit 135 and the information collected by the collection unit 121. Here, among pieces of the information collected by the collecting unit 121, pieces of the information after a predetermined collection timing or after a collection timing dynamically determined based on a dispersion degree of the information may be used for determining the above-described type.

The model setting unit 123 reads, from the type-and-model storage unit 135, a model associated with a type determined by the type determination unit 122, and sets the read model in the control unit 124. The model to be read is a numerical value, a function, a coefficient (parameter) used in a numerical expression, or the like that characterizes driving of a vehicle.

The control unit 124 executes control of the vehicle in accordance with the model set by the model setting unit 123.

The accumulation unit 131 accumulates information collected by the collection unit 121. The information accumulated by the accumulation unit 131 is analysis target data that indicates some properties concerning a driving environment such as a user, an external environment, and an internal state. The attribute selection unit 132 selects attributes suitable for classification and learning, by referring to the information (data) accumulated in the accumulation unit 131.

The classification unit 133, by using the data accumulated in the accumulation unit 131 and the attributes selected by the attribute selection unit 132, classifies driving properties included in the data. Then, the classification unit 133 stores a result of the classification, in the type-and-model storage unit 135.

The model learning unit 134 learns a model concerning the data accumulated in the accumulation unit 131, for each of the types classified by the classification unit 133, and stores a result of the learning, in the type-and-model storage unit 135.

The type-and-model storage unit 135 stores the types classified by the classification unit 133, and the information concerning the models learned by the model learning unit 134.

Figure 3:
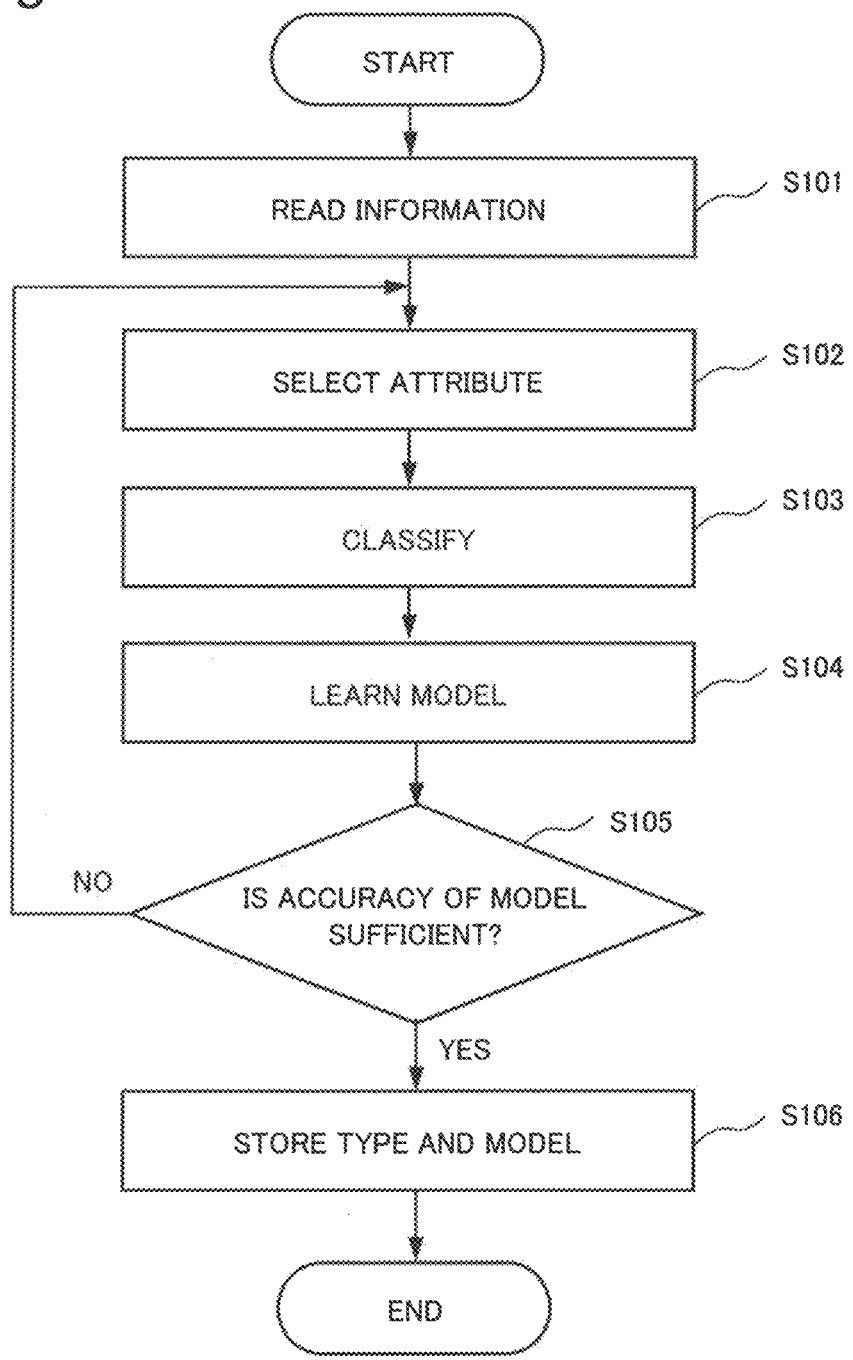
FIG. 3 is a flowchart illustrating an outline of information analysis operation of the vehicle control system according to the second example embodiment.

Next, an outline of operation of the vehicle control system 100 according to the second example embodiment of the present invention is described. FIG. 3 is a flowchart illustrating an outline of information analysis operation of the vehicle control system 100 according to the second example embodiment. The vehicle control system 100 may execute the information analysis operation illustrated in FIG. 3, at any timing in a stage where sufficient information has been accumulated in the accumulation unit 131.

First, the attribute selection unit 132 reads data from the accumulation unit 131 (S101), and selects attributes included in the read data (S102). The attribute selection unit 132 may also select the attributes in addition to an attribute selected in advance by a designer of the system.

The classification unit 133 classifies driving properties included in the data read from the accumulation unit 131, by using the attributes selected by the attribute selection unit 132 as elements of a characteristic vector (S103). For the classification, a well-known clustering method such as k-means method may be used.

As a result of the classification, when there is an imbalance between the numbers of samples for respective types, the procedure may return to the process S102 to select attributes again. In other words, based on the numbers of samples, the selection of attributes may be repeated. A threshold value indicating whether or not there is an imbalance may be set in advance with respect to the numbers of samples. The model learning unit 134 extracts, from the information read at the process S101, data belonging to the type for each of the types classified by the classification unit 133, and learns a model in the type (S104). For learning the model, a well-known regression analysis method such as a linear regression analysis may be used.

Here, the model represents characteristics of the attributes or a relation between the attributes. The model may be, for example, a numerical expression which is different depending on a type, a numerical expression which is the same regardless of a type, or a constant value. Alternatively, the model may be a table or the like that indicates a predetermined correspondence relation, or may be a decision tree. The model may be a numerical expression that can be expressed by using a parameter.

As a result of the learning of the model, when accuracy of the model is not sufficiently high (No at S105), the procedure may return to the process S102 to select attributes again. When accuracy of the model becomes sufficiently high (Yes at S105), the classification unit 133 and the model learning unit 134 store the result of the classification and the result of the model learning, respectively, in the type-and-model storage unit 135 (S106).

Note that accuracy of the model may be obtained based on an error of driving property calculated by using the model, for the data used in the learning at S104, for example. For example, when the error is smaller than a threshold value, it may be determined that accuracy of the model is sufficiently high. Alternatively, accuracy of the model may be obtained by using hold-out validation or cross validation, for example.

Figure 4:
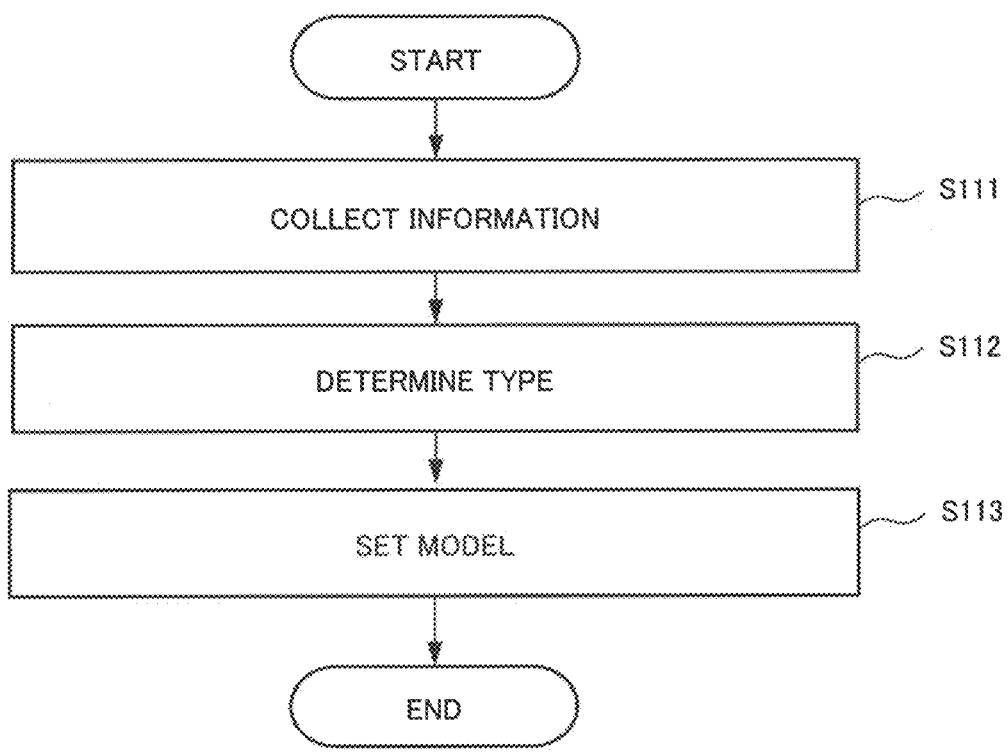
FIG. 4 is a flowchart illustrating an outline of control execution operation of the vehicle control system according to the second example embodiment.

Next, control execution operation of the vehicle control system 100 according to the second example embodiment is described. FIG. 4 is a flowchart illustrating an outline of control execution operation of the vehicle control system 100 according to the second example embodiment. The control execution operation is operation of executing control of the vehicle control system 100 for a user, by using a result of the classification generated by the above-described information analysis operation and a result of the model learning. The vehicle control system 100 executes the control execution operation after the above-described information analysis operation has been completed.

First, the collection unit 121 collects information indicating internal and external information of the vehicle control system 100, i.e., information indicating a user, an external environment, an internal state, and the like (S111). Next, the type determination unit 122 determines, by referring to the information collected at S111, which type a use situation of the vehicle control system 100 belongs to, based on the information concerning the types stored in the type-and-model storage unit 135 (S112).

The model setting unit 123 reads a model associated with the type determined at S112, from the type-and-model storage unit 135, and sets the read model in the control unit 124 (S113). Thereby, the control unit 124 performs control in such a way that the vehicle control system 100 operates based on the set model.

As described above, according to the second example embodiment, the model learning unit 134 of the vehicle control system 100 performs learning on accumulated data, for each of types classified by the classification unit 133, thereby achieving an advantageous effect to suppress increase in learning time and in an amount of a learning result comparing with the case where learning is performed with respect to an attribute selected for each of pieces of accumulated data.

Further, as described above, increase in an amount of a learning result is suppressed, thereby achieving an advantageous effect to shorten a validation time of the learning result. Furthermore, it is possible to shorten the time, for the model setting unit 123, to search the type-and-model storage unit 135 for a model fitting a current user, an external environment, and an internal state of the vehicle control system 100.

Further, according to the second example embodiment, the attribute selection unit 132 selects, from accumulated information, attributes concerning a user, an external environment, an internal state, and the like, thereby achieving an advantageous effect to reduce a cost for selecting attributes in advance. Further, the attribute selection unit 132 selects attributes again depending on a result of the classification and a result of the model learning, thereby achieving an advantageous effect to enhance accuracy of learning and determining environment.

Third Example Embodiment

Figure 5:
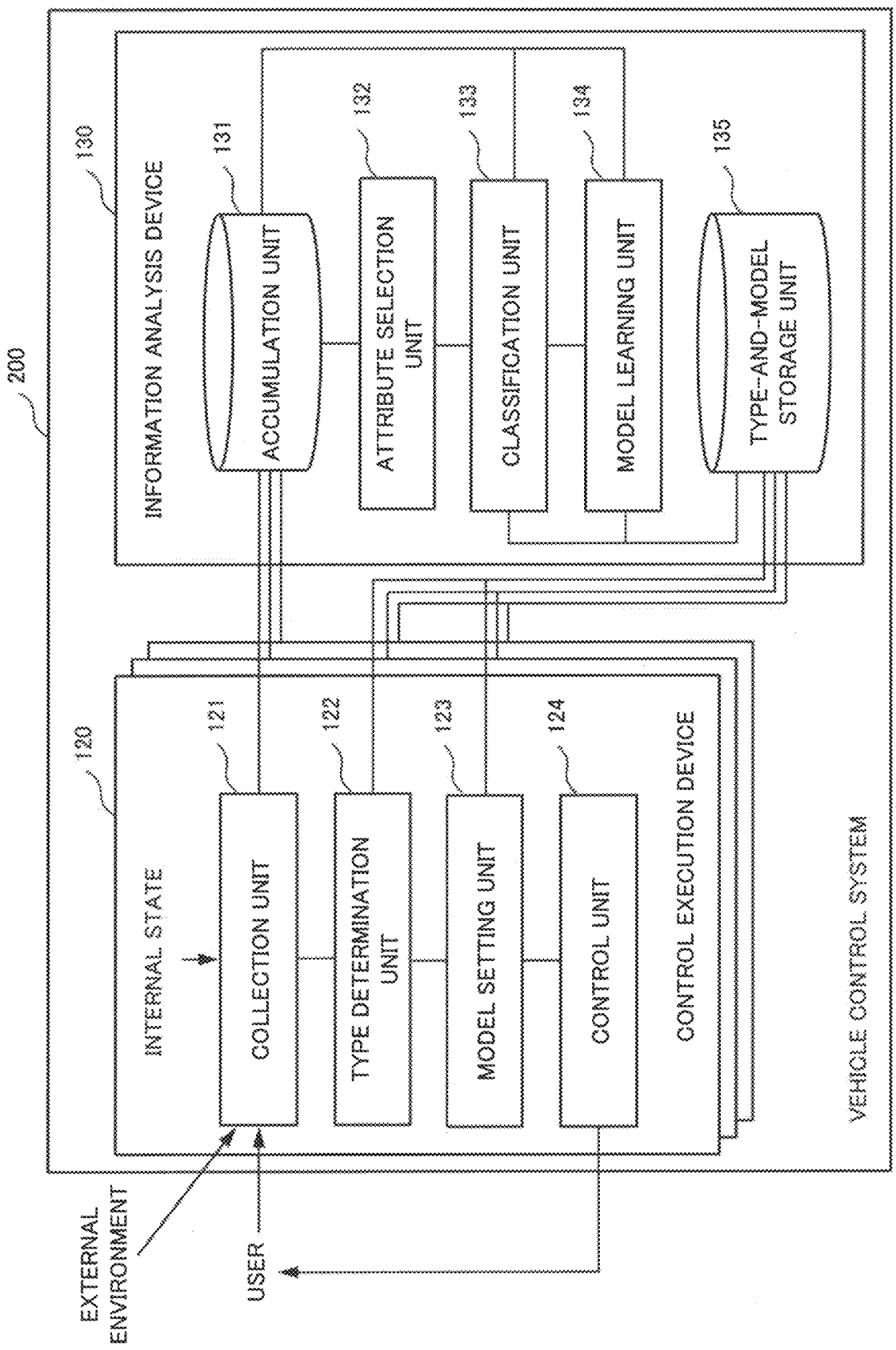
FIG. 5 is a diagram illustrating a configuration of a vehicle control system according to a third example embodiment of the present invention.

FIG. 5 is a diagram illustrating a configuration of a vehicle control system 200 according to a third example embodiment of the present invention. The vehicle control system 200 according to the third example embodiment includes one or more control execution devices 120 and an information analysis device 130. Each of the control execution devices 120 includes the collection unit 121, the type determination unit 122, the model setting unit 123, and the control unit 124 described in the second example embodiment. The information analysis device 130 includes the accumulation unit 131, the attribute selection unit 132, the classification unit 133, the model learning unit 134, and the type-and-model storage unit 135 described in the second example embodiment.

The control execution device 120 and the information analysis device 130 are communicably connected to each other with a wired or wireless channel.

The accumulation unit 131 accumulates information from the collection unit 121 of the one or more control execution devices 120. Information in the type-and-model storage unit 135 is read by the type determination units 122 and the model setting units 123 of the one or more control execution devices 120. Operations of the other constituent elements are the same as the operations described in the second example embodiment. The plurality of the control execution devices 120 may operate independently of each other.

As described above, according to the third example embodiment, in the vehicle control system 200, the one information analysis device 130 performs the control analysis operation for a plurality of the control execution devices 120. The plurality of the control execution devices 120 can share the information analysis device 130, thus achieving an advantageous effect to reduce necessary hardware. Further, information from the plurality of the collection units 121 is accumulated in the accumulation unit 131, and based on the information, model learning is performed, thus achieving an advantageous effect to improve accuracy of the model learning by accumulating more information.

Fourth Example Embodiment

Figure 6:
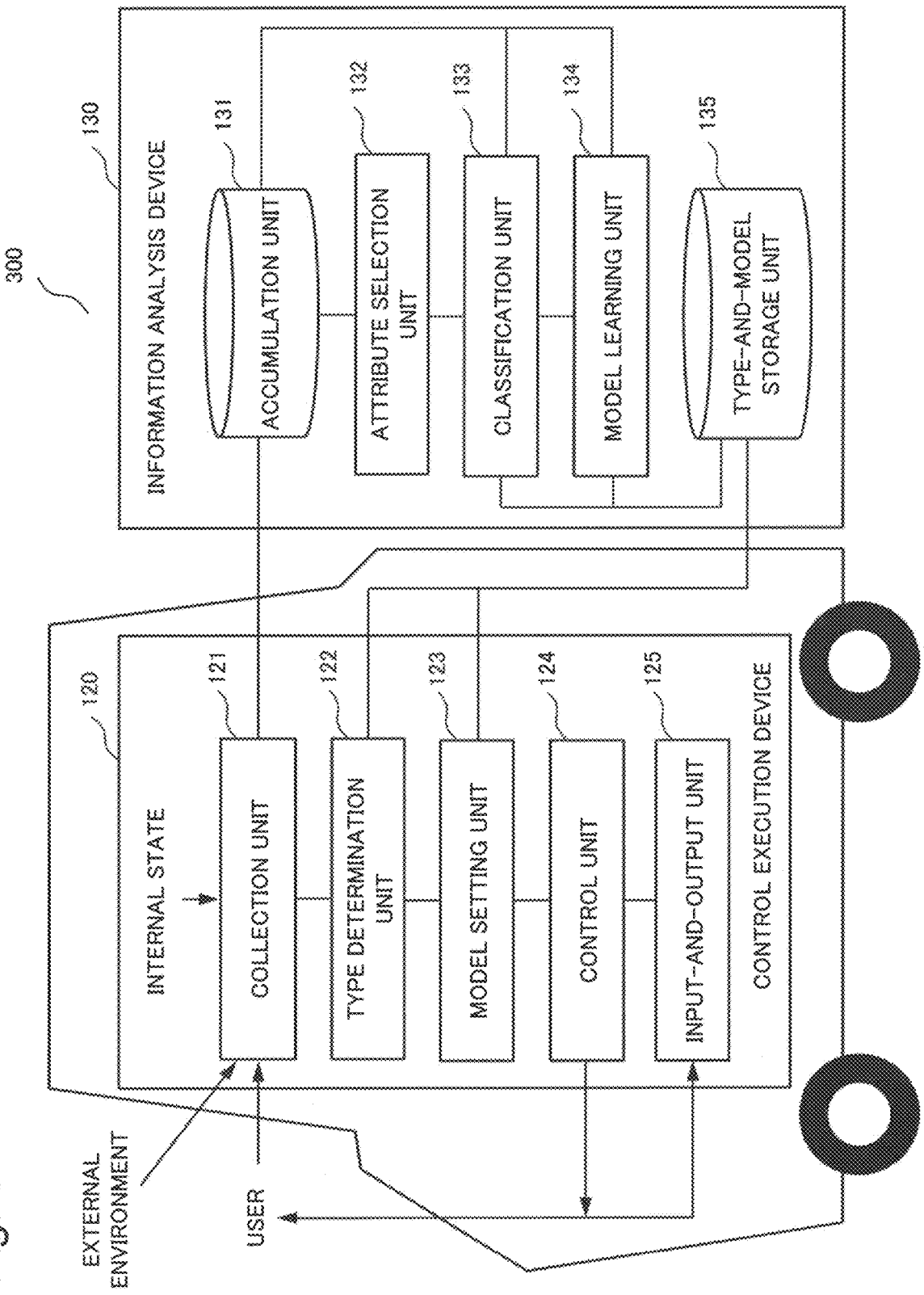
FIG. 6 is a diagram illustrating a configuration of a vehicle control system according to a fourth example embodiment of the present invention.

FIG. 6 is a diagram illustrating a configuration of a vehicle control system 300 according to a fourth example embodiment of the present invention. The fourth example embodiment describes an example in which the vehicle control system 200 described with reference to FIG. 5 in the third example embodiment is applied to control of driving of a vehicle. It is assumed that the control execution device 120 of the vehicle control system 300 is mounted in a vehicle. The control execution device 120 further includes an input-and-output unit 125 in addition to the control execution device 120 illustrated in FIG. 5.

The collection unit 121 of the control execution device 120 includes a driver identification device. The driver identification device identifies a user (driver) who drives a vehicle. A user is identified, for example, by input from a terminal or the like by the driver, by reading of an ID card of the driver, or by analyzing biological information of the driver such as a fingerprint or a face, or the like. Alternatively, a user may be identified from a driving property at the start of use.

Further, the collection unit 121 includes a camera, and by the camera, collects information concerning an external environment such as weather. The information concerning the external environment may be also information concerning a road (driving road) on which the vehicle drives. The information concerning a road may be information indicating a road width, a curved degree of a curve, and the like. Furthermore, the collection unit 121 includes a speed sensor, and by the speed sensor, collects, as an internal state, vehicle speed information, for example. The collected information is accumulated in the accumulation unit 131.

Note that the vehicle control system 300 according to the fourth example embodiment is not limited to control of one vehicle in which the control execution device 120 is mounted, but may control a plurality of vehicles in which the control execution devices 120 are mounted respectively as described in the third example embodiment. Further, information may be exchanged between the control execution device 120 and the information analysis device 130 with wireless channel. Furthermore, the information analysis device 130 may be accommodated in a management room or the like separately from the control execution device 120.

FIG. 7 is a diagram illustrating an example of information (data) accumulated in the accumulation unit 131. The data include a driver identifier (ID), a speed in acceleration, a speed in deceleration, a braking distance, and weather, for example. The driver ID is an identifier for identifying a user. The speed in acceleration is a speed indicated in time series (e.g., at one-second intervals) when a vehicle accelerates. The speed in deceleration is a speed indicated in time series (e.g., at one-second intervals) when the vehicle decelerates. The braking distance is a distance moved from the start of braking to the stop. The weather is weather when the information is acquired.

Hereinafter, operation of the vehicle control system 300 according to the fourth example embodiment is described with reference to FIG. 3 illustrated in the above-described second example embodiment.

The attribute selection unit 132 reads data accumulated in the accumulation unit 131 (S101), and selects attributes included in the data (S102). The attribute may be an item (environment item) for determining a driving environment, such as a surrounding environment of the vehicle or a characteristic of a user, for example. By selecting the attributes appropriately, an appropriate driving environment is determined.

For example, the attribute selection unit 132 selects, as attributes for classification, for example, a driver ID, weather, a speed ratio in acceleration, a braking distance ratio, and the like. The speed ratio in acceleration is, for example, a ratio of a speed at each time to a speed when acceleration of the vehicle has completed. The braking distance ratio is, for example, a ratio of a braking distance at each time to a braking distance under clear weather.

The attributes may be selected in advance by a designer of the vehicle control system 300, or may be selected based on a predetermined criterion, for example. Alternatively, the attributes may be selected by using the feature-quantity automatic-designing technique described in NPL 1.

The classification unit 133 classifies driving properties by using the attributes selected by the attribute selection unit 132 as elements of a feature vector, referring to the data accumulated in the accumulation unit 131 (S103).

Figure 8:
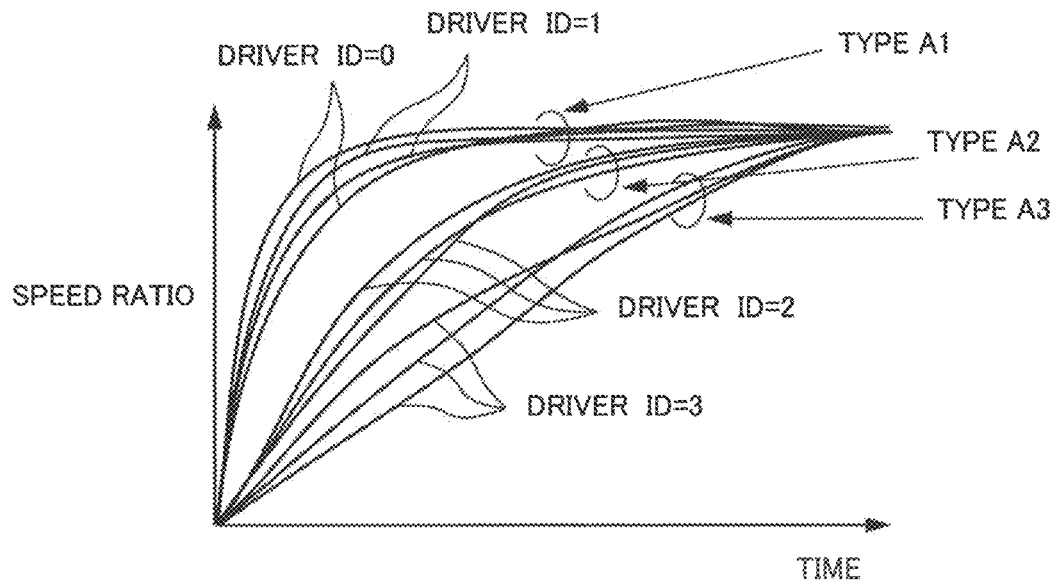
FIG. 8 is a diagram illustrating an example of a result of classification of speeds in acceleration.

FIG. 8 is a diagram illustrating a result of classification of a speed in acceleration. In FIG. 8, the above-described speed ratio in acceleration of each time is illustrated for each driver. In this case, the driver ID is selected as an attribute to be classified.

In FIG. 8, speeds in acceleration included in the data whose driver IDs are "0" and "1" are classified into a type "A1", a speed in acceleration included in the data whose driver ID is "2" is classified into a type "A2", and a speed in acceleration included in the data whose driver ID is "3" is classified into a type "A3", respectively.

For the classification, a well-known clustering method such as k-means method may be used. In the case of using the k-means method, for example, as in FIG. 8, the classification unit 133 plots speed ratios each time for each driver, based on the data illustrated in FIG. 7. The classification unit 133 selects any plural ones of a plurality of approximation curves of the plots. Then, the classification unit 133 may determine, as the same type, pieces of information (samples) indicated by the approximation curves close to each of the selected approximation curves. In other words, the driving properties are classified based on distances between approximation curves, by using the k-means method.

As a result of the classification, when there is an imbalance between the numbers of samples for respective types, the procedure may return to the process S102, and the selection of the attributes may be performed again. Then, for the selected attributes, the classification may be performed again by the k-means method or the like as described above, and when the imbalance between the numbers of samples does not occur, the classification may be completed. In this manner, the classification unit 133 may repeat the classification until the imbalance between the numbers of samples is corrected.

Figure 9A:
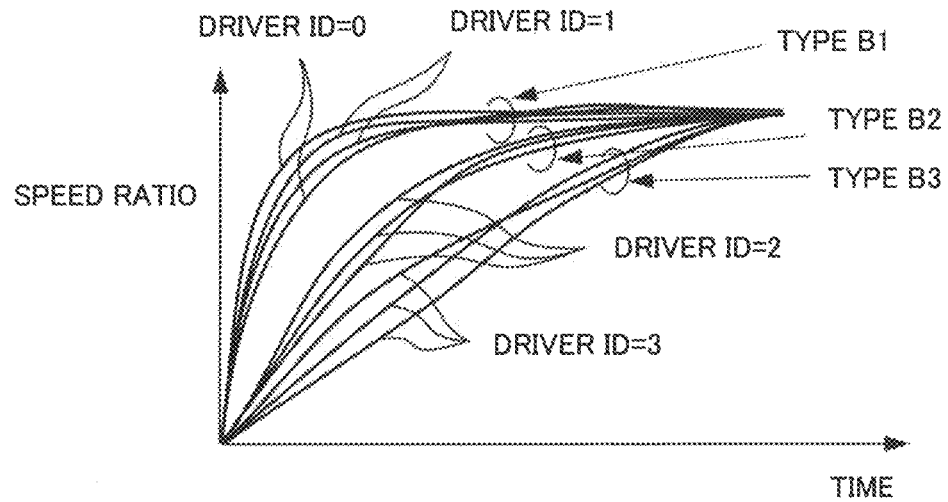
FIG. 9A is a diagram illustrating another example of a result of classification of speeds in acceleration.
Figure 9B:
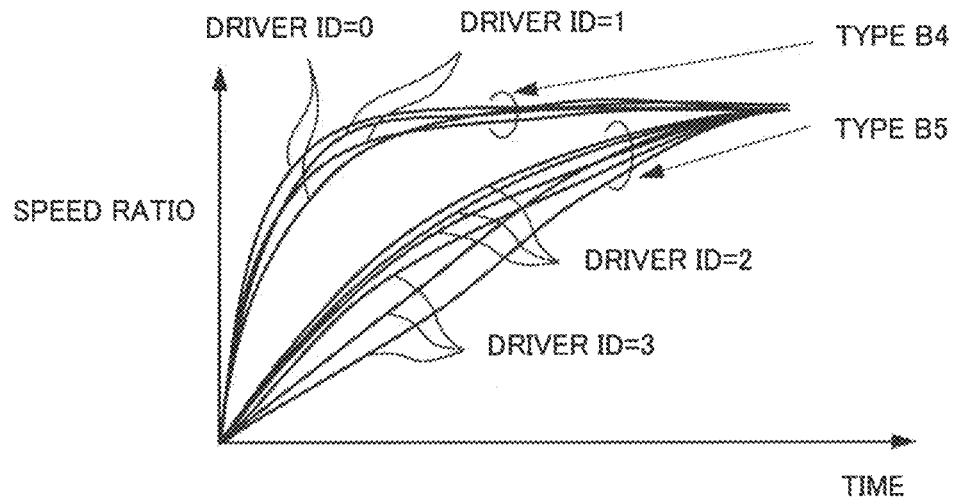
FIG. 9B is a diagram illustrating another example of a result of classification of speeds in acceleration.
Figure 9C:
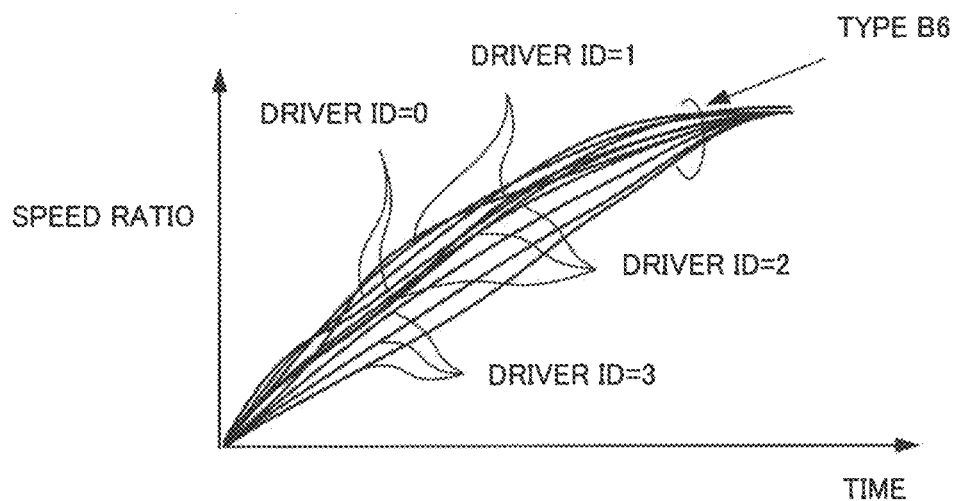
FIG. 9C is a diagram illustrating another example of a result of classification of speeds in acceleration.

FIGS. 9A to 9C are diagrams illustrating other examples of results of the classification of speeds in acceleration. FIGS. 9A to 9C illustrate the results acquired by selecting, as attributes for the classification, a driver ID, a speed in acceleration, and weather, and by classifying speeds in acceleration using the combination of the attributes. FIG. 9A, FIG. 9B, and FIG. 9C illustrate the results of the classification of speeds in acceleration per driver ID when weather is "clear", "fair", or "cloudy", when the weather is "rain", and when the weather is "snow", respectively.

As illustrated in FIG. 9A, speeds in acceleration included in the data where the driver IDs are "0" and "1" and the weather is "clear", "fair", or "cloudy" are classified into a type "B1", speeds in acceleration included in the data where the driver ID is "2" and the weather is "clear", "fair", or "cloudy" are classified into a type "B2", and speeds in acceleration included in the data where the driver ID is "3" and the weather is "clear", "fair", or "cloudy" are classified into a type "B3", respectively.

As illustrated in FIG. 9B, speeds in acceleration included in the data where the driver IDs are "0" and "1" and the weather is "rain" are classified into a type "B4", and speeds in acceleration included in the data where the driver IDs are "2" and "3" and the weather is "rain" are classified into a type "B5", respectively. Further, as illustrated in FIG. 9C, speeds in acceleration included in the data of all the driver IDs where the weather is "snow" are classified into a type "B6".

Figure 10:
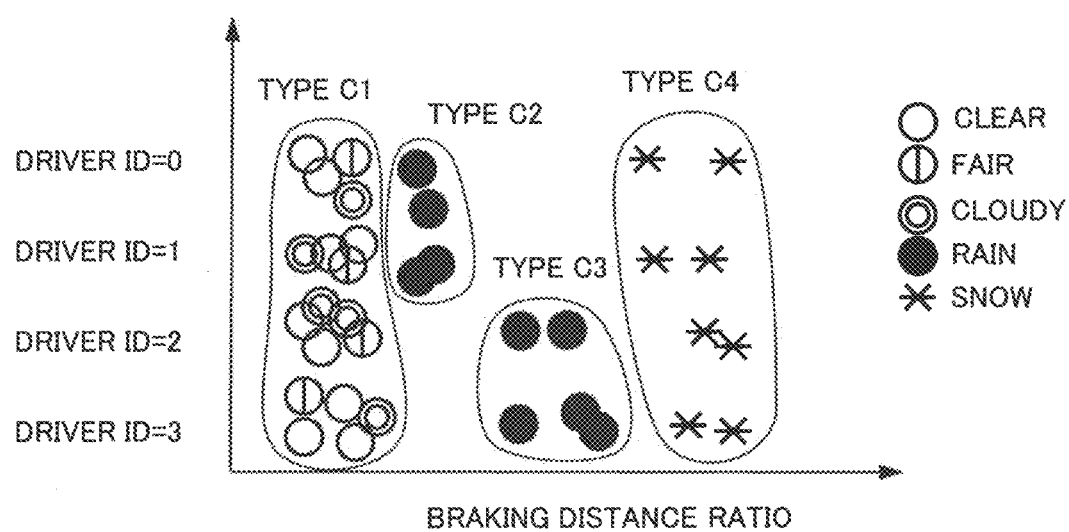
FIG. 10 is a diagram illustrating an example of a result of classification of braking distances in deceleration.

FIG. 10 is a diagram illustrating a result of classification of the braking distance in deceleration. Here, the illustrated result is acquired by selecting, as the attributes for the classification, a driver ID, the weather, and the braking distance, and by classifying braking distances in deceleration using the combination of the attributes. Braking distances in deceleration included in the data where the weather is "clear", "fair", or "cloudy" are classified into a type "C1", braking distances in deceleration included in the data where the driver IDs are "0" and "1" and the weather is "rain" are classified into a type "C2", braking distances in deceleration included in the data where the driver IDs are "2" and "3" and the weather is "rain" are classified into a type "C3", and braking distances in deceleration included in the data where the weather is "snow" are classified into a type "C4", respectively.

When the classification is completed, the model learning unit 134 extracts, for each of the types classified by the classification unit 133, data belonging to the type from the accumulation unit 131, and learns a model representing a driving property of the vehicle in the type, as described above. For learning the model, a well-known regression analysis method such as a linear regression analysis may be used. Alternatively, heterogeneous mixed learning as described in NPL 2 may be used. For example, the model learning unit 134 learns a model representing a speed ratio in acceleration (hereinafter, referred to also as an acceleration pattern), or representing a braking distance ratio, for each of the types.

For example, in the case of the type B1 illustrated in FIG. 9A, the model learning unit 134 reads the data whose driver IDs are "0" or "1" from the accumulation unit 131, and learns an acceleration pattern thereof.

Here, as described in the third example embodiment, the model represents characteristics of the attributes or a relation between the attributes. The model may be, for example, a numerical expression which is different depending on a type, a numerical expression which is the same regardless of a type, or a constant value. Alternatively, the model may be a table including a relation between time and a speed, or the like, for example. Instead, the model may be a numerical expression that can be expressed by using parameters, or may be a decision tree. For example, when braking distances are classified as illustrated in FIG. 10, the model may be a constant value indicating the braking distance ratio for each of the types.

When accuracy of the model learning is not sufficient (No at S105), the procedure may return to the process S102 to select attributes again. When learning accuracy becomes sufficiently high (Yes at S105), the classification unit 133 and the model learning unit 134 store a result of the classification and a result of the model learning, in the type-and-model storage unit 135, respectively (S106).

In this manner, the classification unit 133 and the model learning unit 134 optimize the model as well as the selection of attributes, by using a method such as regression analysis until accuracy of the model learning becomes sufficiently high. In other words, the selection of the attributes and the classification are repeated based on performance of the model. The model may be optimized based on a predetermined evaluation value representing the performance, for example.

A control information for each of the types is determined by using information (hereinafter, referred to as "type information") that includes the type and the associated model stored in the type-and-model storage unit 135. Note that the classification unit 133 and the model learning unit 134 are referred to also as a control information determination means.

FIGS. 11 to 13 are diagrams each illustrating an example of the type information stored in the type-and-model storage unit 135. As illustrated in FIGS. 11 to 13, the type information includes a type, a condition, and a model.

FIG. 11 is a diagram illustrating the type information for the types A1, A2, and A3 illustrated in FIG. 8. In FIG. 11, the type A1 indicates that a model "acceleration pattern A1" has been generated as a result of the learning of the model representing the driving property included in the data where the driver ID is "0" or "1". The acceleration pattern A1 may be a coefficient or the like that determines a curve as illustrated in FIG. 8, for example. Note that the condition in FIG. 11, driver ID "0" or "1", indicates a condition to determine a type as the type A1.

FIG. 12 is a diagram illustrating the type information for the types B1 to B6 illustrated in FIGS. 9A to 9C. In FIG. 12, the type B1 indicates that a model "acceleration pattern B1" has been generated as a result of the learning for the data where the driver ID is "0" or "1" and the weather is "clear", "fair", or "cloudy", for example.

FIG. 13 is a diagram illustrating the type information for the types C1 to C4 illustrated in FIG. 10. In FIG. 13, the type C1 indicates that a model "braking distance ratio=1" has been generated as a result of the learning for the data where the weather is "clear", "fair", or "cloudy", for example.

Alternatively, the model may be a value or the like that represents a driving property of the vehicle such as a direction (steering-wheel angle), a speed, an acceleration rate, a position in a driving road, or the like of the vehicle. Such a model enables vehicle control adapted to a driving property of a driver, regarding how to accelerate at a corner of a road, whether making a wide turn or a tight turn when the vehicle turning a corner of a road, or the like, for example.

The result of the classification and the result of the model learning as described above are stored in the type-and-model storage unit 135.

Here, the number of types is described. As illustrated in FIG. 8, for example, the number of types "3" is less than the number of drivers "4". Further, as illustrated in FIGS. 9A to 9C, the number of types "6" is less than the number of combinations (4×5=)"20" of the number of drivers "4" and the number of kinds of the weather "5". Further, also in the case illustrated in FIG. 10, the number of types "4" is less than the number of combinations (4×5=)"20" of the number of drivers "4" and the number of kinds of the weather that "5". Thus, the learning time can be shortened by learning for each of the types, rather than by learning for each of the attributes or each of the combinations of the attributes.

By using a result of the classification and a result of the model learning that are stored in the type-and-model storage unit 135 as described above, the vehicle control system 300 performs the control execution operation as follows.

Hereinafter, the control execution operation of the vehicle control system 300 according to the fourth example embodiment is described with reference to FIG. 4 illustrated in the above-described second example embodiment. Here, a control target may be a speed, a direction (steering-wheel angle), an operation amount of a brake, an operation timing of the brake, or the like of the vehicle, for example, and is set in advance in the control execution device 120. It is assumed that a speed of the vehicle is set as the control target, for example.

In the vehicle in which the control execution device 120 is mounted, the collection unit 121 collects information indicating a user, an external environment, an internal state, and the like, in response to start of use by the user, for example.

The type determination unit 122 determines which type a use situation of the control execution device 120 belongs to, for the control target, by using the information collected by the collection unit 121 and the information stored in the type-and-model storage unit 135 as described above. For example, when the collection unit 121 collects the driver ID "3" and the weather "fair" as collected information, the type determination unit 122 determines that the use situation of the control execution device 120 belongs to the type B3, based on the type information for a speed illustrated in FIG. 12.

Subsequently, the model setting unit 123 reads the model of the type determined by the type determination unit 122, from the type-and-model storage unit 135, and sets the read model in the control unit 124. Specifically, the model setting unit 123 sets an acceleration pattern conforming to the "acceleration pattern B3" that is the model acquired as a result of the learning for the type B3 illustrated in FIG. 9A, in the control unit 124.

FIG. 14 is a diagram illustrating an example of a model set in the control unit 124 by the model setting unit 123. As illustrated in FIG. 14, the model may be a table including, for example, elapsed time (s) at intervals of one second from the start of acceleration and a speed (km/h) of the vehicle at each elapsed time.

When the model is set as described above, the control unit 124 controls driving of the vehicle in accordance with the model. For example, when a table as illustrated in FIG. 14 is set, the control unit 124 calculates an acceleration rate for reaching the speed set at each elapsed time, and controls accelerator with an amount corresponding to the acceleration rate.

Driving of the vehicle is controlled in such a way as to conform to the set model by the control unit 124 as described above.

Figure 15:
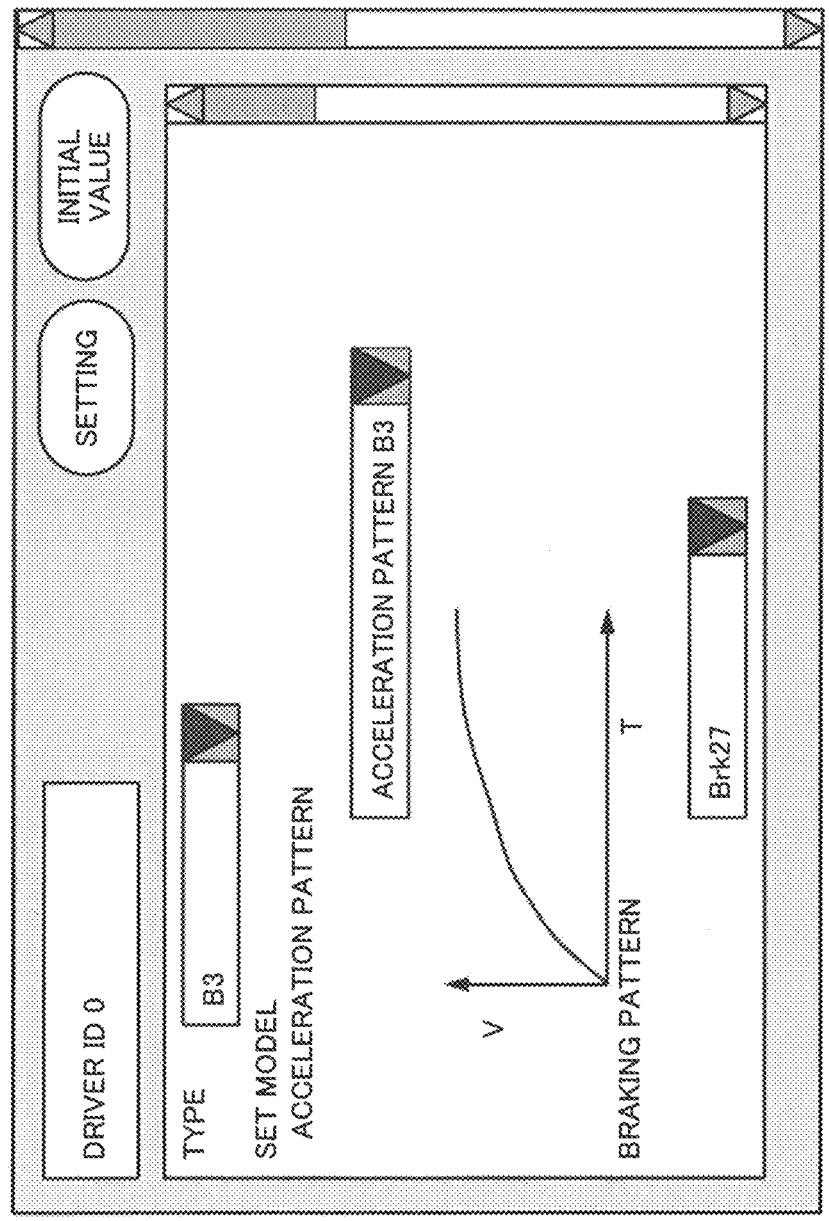
FIG. 15 is a diagram illustrating an example of a user interface concerning model setting.

Further, the control unit 124 may display the control information on the input-and-output unit 125 such as a display in the vehicle. FIG. 15 is a diagram illustrating an example of a user interface for the model setting. The driver ID indicates the ID (here, "0") of a driver determined by the driver identification device. The type indicates the type (here, "B3") determined by the type determination unit 122. The set model indicates the acceleration pattern and the braking pattern read from the type-and-model storage unit 135. Here, the acceleration pattern "acceleration pattern B3" and a braking pattern "Brk 27" are illustrated, respectively.

The control unit 124 may display, when acquiring the above-described information from the model setting unit 123, the acquired information on the input-and-output unit 125 as illustrated in FIG. 15.

Further, via the interface as illustrated in FIG. 15, a user may change the type and the model to be set. In other words, the input-and-output unit 125 receives input of a type and a model to be set from the user, and notifies the control unit 124 thereof when receiving depression of a "SETTING" button illustrated in FIG. 15, for example. In response to the notification, the control unit 124 may control driving of the vehicle, by using the input model to be set. In addition, it is described above that a speed of the vehicle is set in advance as a control target, but input of a control target may be received from a user, and control for the input control target may be performed.

As described above, according to the fourth example embodiment, the attribute selection unit 132 selects attributes appropriate for the classification and the learning from data that are accumulated in the accumulation unit 131 and indicates a user, an external environment, an internal state, and the like, of the vehicle. The classification unit 133 classifies the data by using the selected attributes. The model learning unit 134 learns a model representing a driving property included in the data, for each of the types classified by the classification unit 133. Then, the control unit 124 controls driving of the vehicle, based on the model of the type. Therefore, it is possible to control the vehicle reflecting the environment and the characteristic of the user.

According to the fourth example embodiment, by adopting the above-described configuration, a model is learned for each type, thereby achieving an advantageous effect to control driving of the vehicle reflecting an environment and a characteristic of a user, while suppressing increase in the learning time and in an amount of the learning result. Further, since an amount of the learning result can be reduced, it is possible to shorten the validation time of the learning result. Furthermore, since an amount of the information stored in the type-and-model storage unit 135 is reduced, it is possible to shorten the time for the model setting unit 123 to search the type-and-model storage unit 135 for type information.

Further, the attribute selection unit 132 selects attributes that characterize driving of the vehicle from the data accumulated in the accumulation unit 131, thereby achieving an advantageous effect to reducing a cost for determining attributes in advance. Furthermore, when attributes are set in advance, unless the selection of the attributes is appropriate, learning and determining of a driving environment cannot be performed with high accuracy. However, according to the fourth example embodiment, attributes are selected again depending on a result of classification or a result of model learning, thereby achieving an advantageous effect to enhance accuracy in learning and in determining an environment.

Note that in the fourth example embodiment, the control of driving of the vehicle by the vehicle control system is described as an example, but the control may be applied to others. For example, the control by the vehicle control system may be applied to temperature control of a room.

In this case, a temperature of an air conditioner, an outdoor temperature, a temperature in a room, and the like are accumulated as collected information in the accumulation unit 131, when a user manually sets the temperature of an air conditioner. Properties included in the accumulated information are classified and models are learned, as described in the above example embodiments.

The control unit 124 sets a temperature of the air conditioner when the user enters the room next time, by using the model that is the result of the learning. Thereby, a temperature suitable for the user is automatically set.

Alternatively, the control by the vehicle control system may be applied to control of room lighting and audio visual (AV) equipment. Specifically, in the case of controlling room lighting and a volume of a television, for example, a volume set to the television, brightness in a room, a program, a time zone, a surrounding sound volume, and the like are accumulated as collected information in the accumulation unit 131 when a user watches the television. Properties included in the accumulated information are classified and models are learned, as described in the above example embodiments.

The control unit 124 sets a volume of the television and lighting of the room when the user turns on the television next time, by using the model that is the result of the learning. Thereby, a volume and lighting suitable for the user are automatically set.

Figure 16:
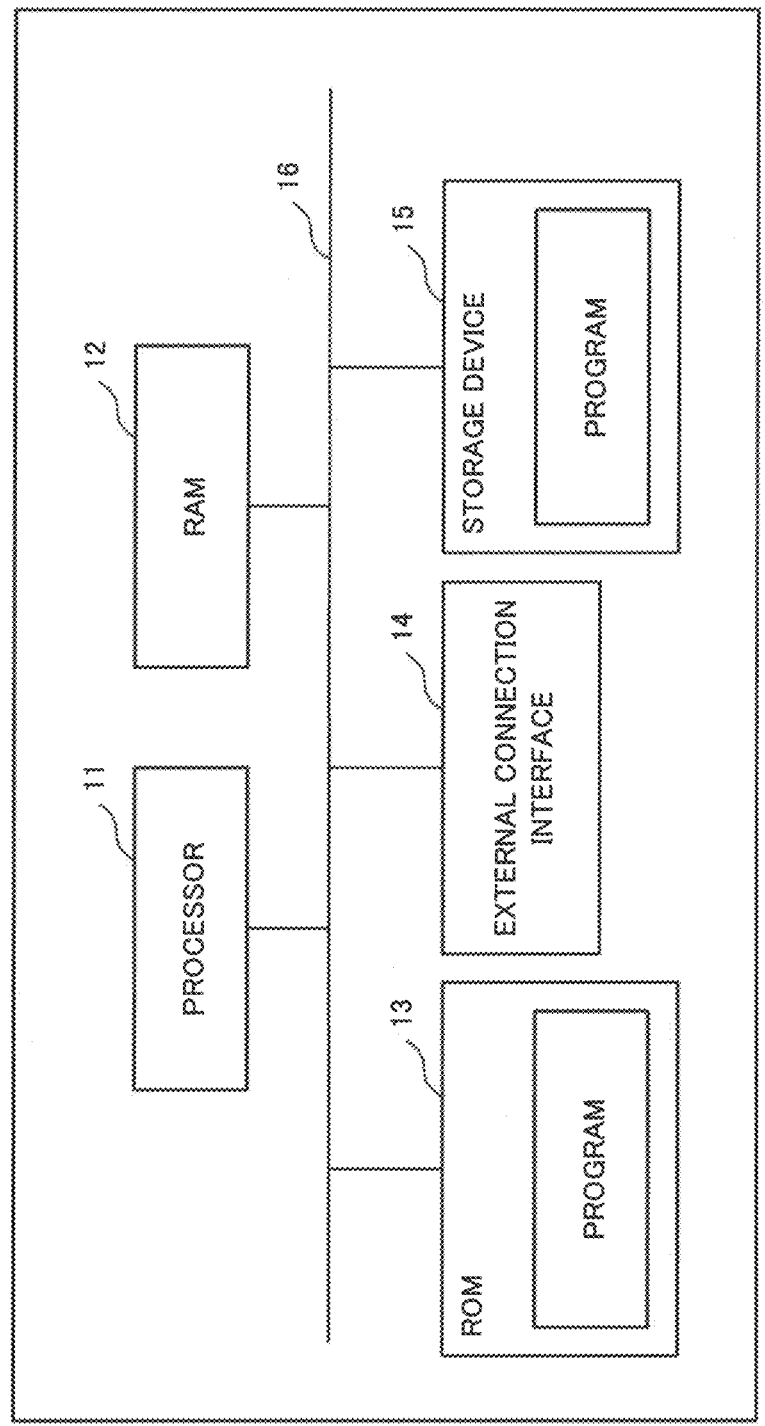
FIG. 16 is a diagram illustrating an example of a hardware configuration for implementing a device described in each of the example embodiments.

Respective units of the devices illustrated in FIG. 1 and the like are implemented by hardware resources exemplified in FIG. 16. A configuration illustrated in FIG. 16 includes a processor 11, a random access memory (RAM) 12, a read only memory (ROM) 13, an external connection interface 14, a recording device 15, and a bus 16 connecting the respective constituent elements.

In each of the above-described example embodiments, a computer program capable of implementing the above-described functions is supplied to the device, and then, the computer program is read to the RAM 12 and executed by the processor 11, as an example of execution by the processor 11 illustrated in FIG. 16. However, a part or all of the functions illustrated in the respective blocks illustrated in each of the drawings may be implemented as hardware.

Such a supplied computer program may be stored in a readable and writable memory (temporary storage medium) or a computer readable storage device such as a hard disk device. Then, in such a case, the present invention can be regarded as being configured by codes representing such a computer program or by a storage medium storing such a computer program.

Such a computer program may be stored in a nonvolatile storage medium.

Further, a part or all of the respective constituent elements of each device are implemented by general-purpose or dedicated circuitry, a processor, or the like, or a combination thereof. These may be configured by a single chip or may be configured by a plurality of chips connected via a bus. A part or all of the respective constituent elements of each device may be implemented by a combination of the above-described circuitry or the like and the program.

When a part or all of the respective constituent elements of each device are implemented by a plurality of information processing devices, pieces of circuitry, or the like, a plurality of the information processing devices, pieces of the circuitry, or the like may be concentratedly arranged, or may be dispersedly arranged. For example, the information processing devices, pieces of the circuitry, or the like may be implemented as a form in which they are connected to each other via a communication network such as a client-and-server system, a cloud computing system.

The present invention is described above with reference to the above-described example embodiments. However, the present invention is not limited to the above-described example embodiments. In other words, according to the present invention, within the scope of the present invention, it is possible to apply various aspects, such as various combinations or selections of the above-disclosed various elements, that can be understood by those skilled in the art.

INDUSTRIAL APPLICABILITY

The present invention can be applied to control of driving of a vehicle, control of an environment control device such as an air conditioner in a living space, control of a device operated by a large number of unspecified users, a robot, and the like, for example. Further, by replacing a user with a material, the present invention can be applied to a manufacturing device or the like that treats various materials.

This application is based upon and claims the benefit of priority based on Japanese Patent Application No. 2016-114997 filed on Jun. 9, 2016, the disclosure of which is incorporated herein in its entirety by reference.

REFERENCE SIGNS LIST

11 Processor
12 RAM

13 ROM
14 External connection interface
15 Recording device
16 BUS
1, 100, 200, 300 Vehicle control system
2 Classification unit
3 Learning unit
4 Control information determination unit
120 Control execution device
121 Collection unit
122 Type determination unit
123 Model Setting unit
124 Control unit
125 Input-and-output unit
130 Information analysis device
131 Accumulation unit
132 Attribute selection unit
133 Classification unit
134 Model learning unit
135 Type-and-model storage unit

What is claimed is:

1. A vehicle control system comprising:
a memory storing instructions; and
one or more processors configured to execute the instructions to:
select one or more attributes from accumulated data including driving properties each related to values of attributes relating to driving of a vehicle;
classify, by using the selected one or more attributes, the driving properties included in the data into types;
associate each of the types with a combination of values of the selected one or more attributes for corresponding one of the types;
learn, for each of the types that are a result of classification, a model representing a driving property classified to corresponding one of the types;
determine, by using the model learned for a type associated with a combination of values of the selected one or more attributes at time of driving of a control target vehicle, control information for the driving; and
control the control target vehicle, based on the determined control information,
wherein, the selection of the one or more attributes and the classification using the selected one or more attributes are repeatedly performed based on performance of the model, while there is an imbalance between numbers of pieces of data classified to respective types, until accuracy of the model satisfies a predetermined condition.

2. The vehicle control system according to claim 1, wherein
the driving properties are classified, by using at least one of a speed, an acceleration rate, and a position on a driving road of a vehicle that are included in the data as each of the driving properties.

3. The vehicle control system according to claim 1, wherein the one or more processors are further configured to execute the instructions to:
output, as the control information, a type relating to the control target vehicle and the model learned for the type.

4. The vehicle control system according to claim 1, wherein the one or more processors are further configured to execute the instructions to:
receive changes of the type relating to the control target vehicle and the model learned for the type, and control the control target vehicle based on the received changes.

5. The vehicle control system according to claim 1, wherein,
the selection of the one or more attributes is repeatedly performed, until a value indicating balance between numbers of pieces of the data classified to respective types satisfies a predetermined threshold.

6. A vehicle control method comprising:
selecting one or more attributes from accumulated data including driving properties each related to values of attributes relating to driving of a vehicle;
classifying, by using the selected one or more attributes, the driving properties included in the data into types;
associating each of the types with a combination of values of the selected one or more attributes for corresponding one of the types;
learning, for each of the types that are a result of classification, a model representing a driving property classified to corresponding one of the types;
determining, by using the model learned for a type associated with a combination of values of the selected one or more attributes at time of driving of a control target vehicle, control information for the driving; and
controlling the control target vehicle, based on the determined control information,
wherein, the selecting of the one or more attributes and the classifying using the selected one or more attributes are repeatedly performed based on performance of the model, while there is an imbalance between numbers of pieces of data classified to respective types, until accuracy of the model satisfies a predetermined condition.

7. A non-transitory computer readable storage medium recording thereon a program causing a computer to perform processes comprising:
selecting one or more attributes from accumulated data including driving properties each related to values of attributes relating to driving of a vehicle;
classifying, by using the selected one or more attributes, the driving properties included in the data into types;
associating each of the types with a combination of values of the selected one or more attributes for corresponding one of the types;
learning, for each of the types that are a result of classification, a model representing a driving property classified to corresponding one of the types;
determining, by using the model learned for a type associated with a combination of values of the selected one or more attributes at time of driving of a control target vehicle, control information for the driving; and
controlling the control target vehicle, based on the determined control information,
wherein, the selecting of the one or more attributes and the classifying using the selected one or more attributes are repeatedly performed based on performance of the model, while there is an imbalance between numbers of pieces of data classified to respective types, until accuracy of the model satisfies a predetermined condition.

* * * * *